(12) United States Patent
Takeda et al.

(10) Patent No.: US 10,455,579 B2
(45) Date of Patent: Oct. 22, 2019

(54) USER TERMINAL, RADIO BASE STATION, AND RADIO COMMUNICATION METHOD

(71) Applicant: NTT DOCOMO, INC., Tokyo (JP)

(72) Inventors: Kazuaki Takeda, Tokyo (JP); Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 123 days.

(21) Appl. No.: 15/514,036

(22) PCT Filed: Sep. 25, 2015

(86) PCT No.: PCT/JP2015/077045
§ 371 (c)(1),
(2) Date: Mar. 24, 2017

(87) PCT Pub. No.: WO2016/047729
PCT Pub. Date: Mar. 31, 2016

(65) Prior Publication Data
US 2017/0290017 A1  Oct. 5, 2017

(30) Foreign Application Priority Data
Sep. 25, 2014  (JP) .................................. 2014-195797

(51) Int. Cl.
*H04W 72/04* (2009.01)
*H04W 74/08* (2009.01)
*H04W 88/02* (2009.01)

(52) U.S. Cl.
CPC ....... *H04W 72/0453* (2013.01); *H04W 72/04* (2013.01); *H04W 72/042* (2013.01);
(Continued)

(58) Field of Classification Search
CPC ........... H04W 72/042; H04W 72/0453; H04W 72/0486; H04W 28/06; H04W 72/02;
(Continued)

(56) References Cited

U.S. PATENT DOCUMENTS 9,232,540 B2 * 1/2016 Xu ..................... H04W 74/0833
2013/0083749 A1 * 4/2013 Xu ..................... H04W 74/0833
370/329

(Continued)

FOREIGN PATENT DOCUMENTS

WO  2013/049520 A1  4/2013
WO  2013/049768 A1  4/2013

OTHER PUBLICATIONS

Office Action issued in corresponding Japanese Application No. 2016-550381, dated Sep. 19, 2017 (9 pages).
(Continued)

*Primary Examiner* — Jung Liu
(74) *Attorney, Agent, or Firm* — Osha Liang LLP

(57) ABSTRACT

According to the present invention, in an LTE system, communication can appropriately carried out even in the case where a bandwidth utilized in the transmission/receiving of data signals and control signals is configured narrower than the system bandwidth. According to an embodiment, a user terminal is configured to carry out communication with a radio base station using a narrow bandwidth that is limited to a narrower bandwidth than a system bandwidth. The user terminal includes a decision section configured to decide a frequency position for the narrow bandwidth to be arranged, based on given information; and a receiving section configured to receive a control signal and a data signal that are allocated on the narrow bandwidth based on the frequency position. The narrow bandwidth is arranged at different frequency positions per a predetermined period of time.

5 Claims, 12 Drawing Sheets

(52) U.S. Cl.
CPC ....... *H04W 74/08* (2013.01); *H04W 74/0833* (2013.01); *H04W 88/02* (2013.01)

(58) Field of Classification Search
CPC ......... H04W 72/1231; H04W 72/1251; H04W 72/12; H04L 5/001; H04L 5/0048; H04L 5/0053; H04L 5/0094
See application file for complete search history.

(56) References Cited

U.S. PATENT DOCUMENTS

| | | | | |
|---|---|---|---|---|
| 2013/0083753 | A1* | 4/2013 | Lee | H04W 74/0833 370/329 |
| 2013/0143502 | A1* | 6/2013 | Kazmi | H04W 88/06 455/62 |
| 2013/0322363 | A1* | 12/2013 | Chen | H04W 72/042 370/329 |
| 2014/0098663 | A1* | 4/2014 | Vos | H04W 72/0486 370/230 |

OTHER PUBLICATIONS

Sony; "(E)PDCCH candidates during MTC coverage extension repetition"; 3GPP TSG RAN WG1 #76, R1-140585; Prague, Czech Republic; Feb. 10-14, 2014 (4 pages).
Office Action issued in the counterpart New Zealand Patent Application No. 731000, dated Jun. 15, 2018 (4 pages).
Extended European Search Report issued in corresponding European Application No. 15843133.8, dated Apr. 5, 2018 (9 pages).
International Search Report issued in corresponding application No. PCT/JP2015/077045 dated Dec. 15, 2015 (4 pages)
Written Opinion of the International Searching Authority issued in corresponding application No. PCT/JP2015/077045 dated Dec. 15, 2015 (5 pages).
NEC"Frequency diversity transmission for enhanced coverage MTC"; 3GPP TSG RAN WG1 Meeting #76, R1-140416; Prague, Czech Republic; Feb. 10-14, 2014 (3 pages).
Huawei, HiSilicon, "Frequency location scheduling for low cost MTC UEs"; 3GPP TSG RAN WG1 Meeting #76bis, R1-141117; Shenzhen, China; Mar. 31-Apr. 4, 2014 (6 pages).
CATT, "Downlink bandwidth reduction for low cost MTC UE for LTE"; 3GPP TSG RAN WG1 Meeting #74, R1-133018; Barcelona, Spain; Aug. 19-23, 2013 (2 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
3GPP TR 36.888 V12.0.0, "3rd Generation Partnership Project; Technical Specification Group Radio Access Network; Study on provision of low-cost Machine-Type Communications (MTC) User Equipment (UEs) based on LTE (Release 12)"; Jun. 2013 (55 pages).
Office Action issued in corresponding New Zealand Application No. NZ731000, dated Oct. 17, 2018 (3 pages).
Office Action issued in counterpart European Patent Application No. 15843133.8, dated Jun. 17, 2019 (6 pages).

* cited by examiner

USER TERMINAL, RADIO BASE STATION, AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, long-term evolution (LTE) has been standardized for the purposes of further increasing high-speed data rates and providing low delay, etc. (non-patent literature 1). Furthermore, for the purpose of achieving further broadbandization and higher speed, successor systems to LTE (which are called, e.g., LTE advanced (hereinafter, "LTE-A"), and FRA (Future Radio Access), etc.) have also been considered.

However, in recent years, due to reduction in cost of transmission devices, technological developments have been actively carried out with respect to machine-to-machine (M2M) transmission, in which devices connected to a network which automatically control by mutual transmission without the use of human hands. In particular, 3GPP (Third Generation Partnership Project) have made progress in the standardization of MTC (Machine Type Communication) optimization among M2Ms as a machine-to-machine cellular system (non-patent literature 2). It is conceivable for an MTC terminal to be utilized over a vast range of fields, e.g., electric (gas) meters, automatic vending machines, vehicle bodies, or other industrial machines, etc.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2".
Non-Patent Literature 2: 3GPP TS 36.888 "Study on provision of low-cost Machine-Type Communications (MTC) User Equipment (UEs) based on LTE (Release 12)".

SUMMARY OF INVENTION

Technical Problem

Among MTC terminals, there has been an increasing demand for low-cost MTC terminals (low-cost MTC UEs) that can be implemented in simple hardware structures to have improvements in regard to cost and cellular system coverage areas. In regard to lowering cost of MTC terminals in LTE systems, implementation of a configuration in which the bandwidth utilized in a physical downlink shared channel (PDSCH) is made narrower than the system bandwidth, i.e., a configuration that is limited to a narrower bandwidth than that of normal terminals, is being considered.

However, a configuration in which the system bandwidth and the shared channel bandwidth differ has not been foreseen by conventional communication systems. Accordingly, if a conventional control signal (PDCCH (Physical Downlink Control channel), etc.), which assumes that the system bandwidth and the shared channel bandwidth are the same, is utilized in a low-cost MTC terminal, there are problems with not being able to attain a reduction in cost and with an unnecessary communication overhead occurring.

Accordingly, it is also conceivable to provide a configuration which reduces the bandwidth allocated for control signals; however, in such a case, how to allocate the control signals becomes a problem. Furthermore, if the control signals that are used in the demodulation of the data signals is allocated in the narrow bandwidth in the same manner as the data signals, how to allocate the control signals and the data signals becomes a problem.

The present invention has been devised in view of the above discussion, and it is an object of the present invention to provide, in an LTE system, a radio base station, a user terminal and a radio communication method which can appropriately carry out communication even in the case where a bandwidth utilized in the transmission/receiving of data signals and control signals is configured narrower than the system bandwidth.

Solution to Problem

According to the user terminal of the present invention, a user terminal is configured to carry out communication with a radio base station using a narrow bandwidth that is limited to a narrower bandwidth than a system bandwidth. The user terminal includes a decision section configured to decide a frequency position for the narrow bandwidth to be arranged, based on given information; and a receiving section configured to receive a control signal and a data signal that are allocated on the narrow bandwidth based on the frequency position. The narrow bandwidth is arranged at different frequency positions per a predetermined period of time.

Technical Advantageous of Invention

According to the present invention, in an LTE system, communication can by appropriately carried out even in the case where a bandwidth utilized in the transmission/receiving of data signals and control signals is configured narrower than the system bandwidth.

DESCRIPTION OF EMBODIMENTS

As described above, in order to achieve a low-cost MTC terminal (low-cost MTC UE), limiting the bandwidth of the downlink data channel (PDSCH) used in downlink data signals to a predetermined narrow bandwidth is being considered. For example, it is conceivable to carry out communication by limiting the downlink data channel to 6 resource blocks (RB, PRB (Physical Resource Block)). Furthermore, limiting the reception RF (e.g., setting the reception RF of the user terminal to 1) in the user terminal is also under consideration.

Accordingly, in addition to the downlink data signal, it is conceivable to also limit the bandwidth that the user terminal utilizes to a narrow bandwidth (e.g., 1.4 MHz) with regard to the control signal transmitted in the downlink (system information, downlink control information (DCI), etc.), and data signals and control signals transmitted on the uplink.

Furthermore, if a user terminal that has such a limited bandwidth is operated in an LTE system, it is necessary to design the user terminal so as to operate on an LTE system bandwidth, in consideration of the compatibility thereof with existing user terminals (normal UEs, non-MTC UE Category 0 UE); for example, by providing a design to support frequency-division-multiplexing between the limited bandwidth user terminal (low-cost MTC UE, Category 1 UE, etc.) and a user terminal (normal UE) that carries out communication on the system bandwidth without the bandwidth being limited. Furthermore, it is conceivable to design the limited bandwidth user terminal so as to only support a predetermined bandwidth (e.g., 1.4 MHz) RF in the uplink (UL) and in the downlink (DL).

Figure 1A:
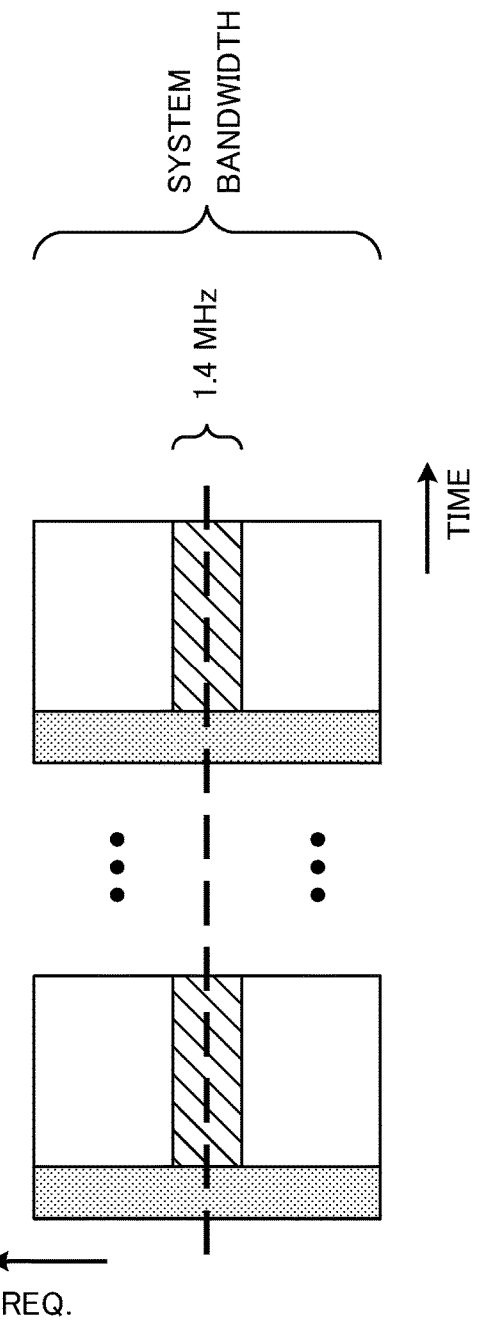
FIG. 1 shows diagrams of examples of allocations of narrow bandwidths used in a user terminal with a limited bandwidth.

However, if the user terminal carries out communication in the limited narrow bandwidth of the system bandwidth, a problem occurs with how to arrange the narrow bandwidth in a frequency axis direction. FIG. 1 shows diagrams of examples of allocations of narrow bandwidths used in a user terminal with a limited bandwidth. For example, it is conceivable to carry out communication with the position of the narrow bandwidth fixed (e.g., fixed at a center frequency of the system bandwidth) with respect to the frequency axis direction (see FIG. 1A). In this case, since the narrow bandwidth to be utilized is already determined, there is little burden on the transmission/receiving control in the user terminal, however, since a frequency diversity effect cannot be obtained, there is a risk of the frequency utilization efficiency deteriorating.

Figure 1B:
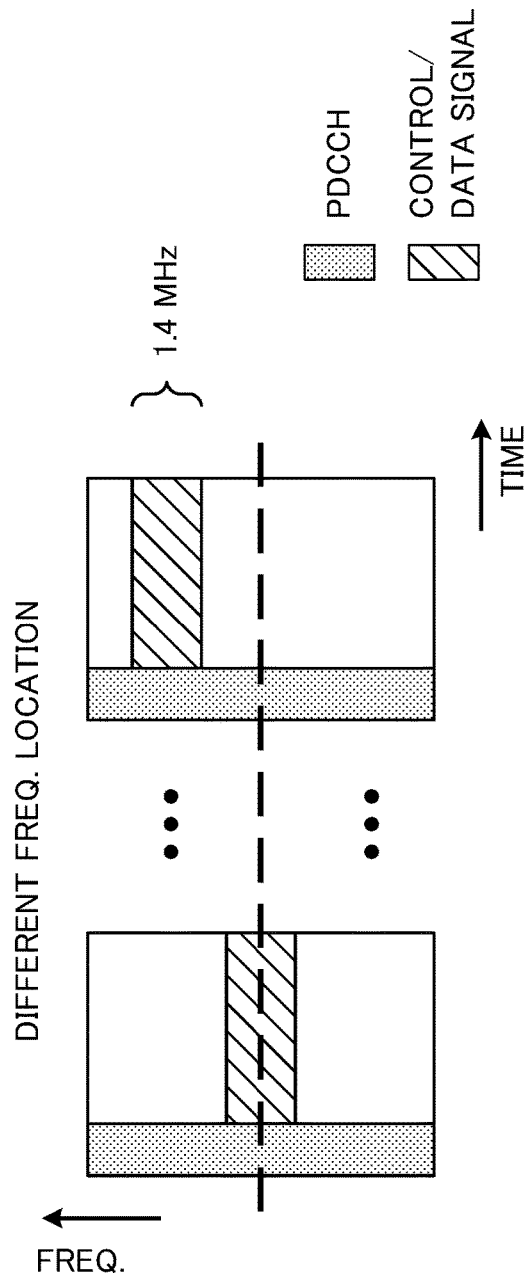

The inventors of the present invention conceived the idea of obtaining a frequency diversity effect by changing a given timing of the narrow bandwidth used by the user terminal when carrying out communication (see FIG. 1B). In addition, with regard to data signal allocation, the inventors of the present invention paid attention to the problem of the signaling overhead becoming very large when using resource allocation control channel information (DCI) in a conventional LTE system, since the DCI is designed to map resources over the entire system bandwidth.

Based on this perspective, the inventors of the present invention arrived at the present invention upon examining resource allocation and sequences for obtaining an ideal frequency diversity effect for signals in an LTE system even in the case where a narrow bandwidth is used the transmission of data signals and control signals. According to the present invention, the frequency utilization efficiency can be improved. Furthermore, the DCI overhead amount in data signal allocation can be reduced.

Details of examples of specific embodiments will be hereinbelow discussed while referring to the drawings. It should be noted that in the below discussion a low-cost MTC terminal is assumed as the user terminal; however, the present invention is not limited thereto. Furthermore, a frequency position indicates a narrow bandwidth frequency resource, and can be expressed as, e.g., a center frequency or bandwidth that constitutes a narrow bandwidth.

First Example: System Information

The first example relates to the allocation of the frequency position of the system information.

In a conventional LTE system, basic system information (MIB (Master Information Block)) transmitted on a PBCH and system information (SIB (System Information Block)) transmitted in a downlink shared channel (PDSCH) are transmitted for Idle mode UEs in a fixed manner in a predetermined bandwidth (e.g., 1.4 MHz (6 RB)) in the center of the system bandwidth.

Whereas, in the first example, although the PBCH and part of the SIB (e.g., indicated as SIB-X) is transmitted in the center of the system bandwidth, the remainder of the SIB is transmitted in a different bandwidth from the center of the system bandwidth.

Specifically, by including information that indicates the frequency position at which an SIB (e.g., indicated as SIB-Y) other than SIB-X is located in the broadcast information of the PBCH and SIB-X (e.g., SIB1, etc.), it is possible to change the frequency position of this other SIB.

Figure 2:
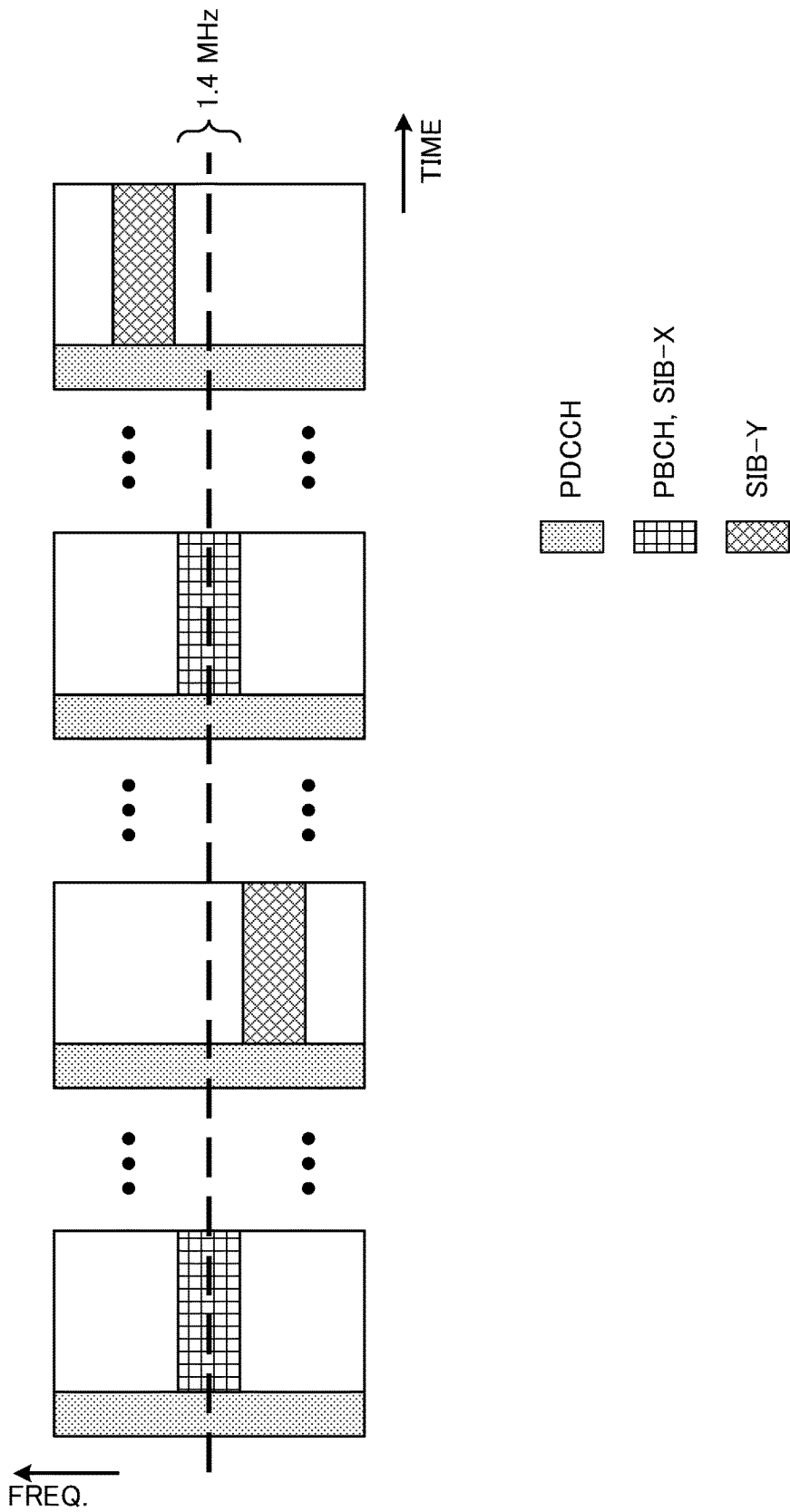
FIG. 2 is an illustrative diagram of system information allocation, according to a first example.

FIG. 2 shows an example of system information allocation according to the first example. While the PBCH and the SIB-X (e.g., X=1) are allocated at a fixed region (e.g., a width of 1.4 MHz) at the system bandwidth center, the SIB-Y (e.g., Y>X) is allocated at a different region from the system bandwidth center.

It should be noted that broadcast information, etc., can be configured for transmission dedicated to MTCs. In such a case, although an MTC terminal can receive (recognize) broadcast information, a normal terminal cannot. Accordingly, even basic system information can be allocated at a location other than at the center of the system bandwidth. For example, the SIB can be transmitted using a plurality of predetermined frequency positions.

Information on the frequency position for SIB allocation for dedicated use in an MTC can be preset in the user terminal, or can be notified by inclusion in the PBCH. Furthermore, information on the frequency position can include, e.g., a bitmap indicating a radio resource position to which an SIB is allocated per subframe, a radio resource start position, the number of RBs of the radio resource, and a hopping pattern of the allocation radio resource, etc.

Figure 3:
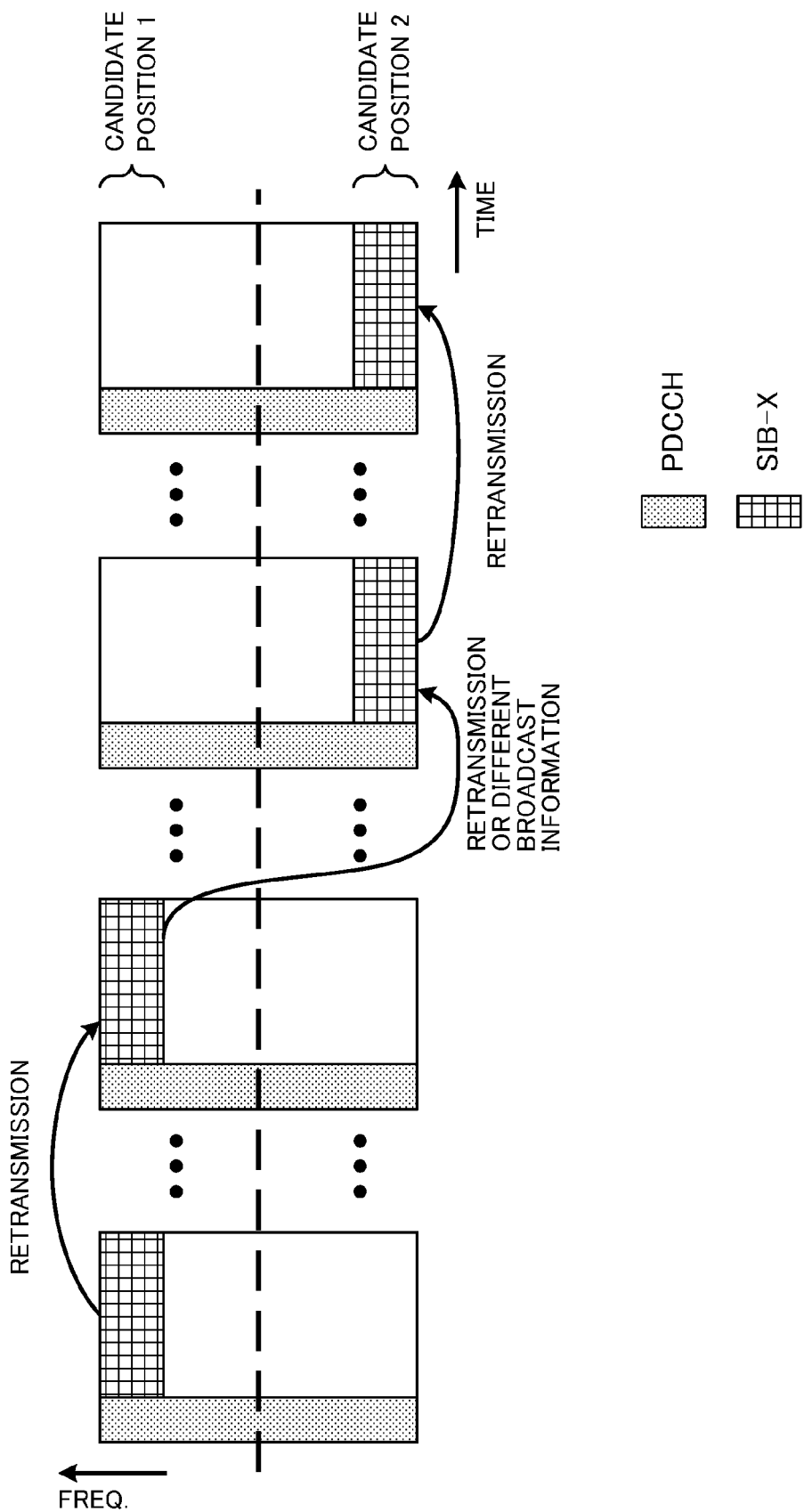
FIG. 3 is an illustrative diagram of a different example of system information allocation, according to the first example.

FIG. 3 shows a different example of system information allocation according to the first example. In this example, two frequency positions at which SIB-X allocation is possible are set (candidate position 1, and candidate position 2);

however, the number of frequency positions (candidate positions) at which allocation is possible is not limited thereto.

In the case of retransmission of the same broadcast information at different frequency positions, a better frequency diversity effect can be obtained than in the case of a fixed frequency position. For example, in FIG. 3, a frequency diversity effect can be obtained by retransmitting the same broadcast information at candidate position 1 and candidate position 2 in different subframes.

A random access procedure will be discussed hereinbelow. In the random access procedure, the user terminal transmits a PRACH (Physical Random Access channel) to a radio base station based on predetermined broadcasting information. Furthermore, the radio base station transmits an RAR grant (Random Access Response grant) on the PDSCH upon receiving the PRACH.

In a conventional LTE, the radio base station transmits a PDCCH (including an RA-RNTI (Random Access Radio Network Temporary Identifier)) that indicates the RAR grant allocation. The PDCCH includes resource allocation information that indicates the radio resource which the RAR grant has allocated.

In the first example, the radio base station transmits an enhanced PDCCH (EPDCCH: Enhanced Physical Downlink Control channel), which indicates the RAR grant allocation, in the frequency position to which the broadcast information is arranged, and transmits the PDSCH on which the RAR grant is provided at the frequency position at which the enhanced PDCCH is transmitted. Accordingly, the user terminal can implicitly assume the frequency position of the RAR grant.

Second Example: EPDCCH

The second example, which relates to a physical downlink control channel allocation method after system information has been obtained and an RRC connection has been established, will be discussed hereinbelow. In this example, since the user terminal needs to receive the physical downlink control channel using a narrow bandwidth, an enhanced PDCCH (EPDCCH) that is frequency-division-multiplexed with a PDSCH is utilized, rather than using an existing PDCCH. By utilizing an EPDCCH in this manner, the user terminal can limit the bandwidth that monitors the EPDCCH to within a predetermined bandwidth (e.g., 1.4 MHz).

In the second example, the EPDCCH frequency position is notified by RRC signaling. For example, the frequency position can be notified at a predetermined time period unit. As one example, a group of frequency positions can be notified per unit of a plurality of subframes, such as: subband (SB)#5 at subframe (SF)#0, SB#1 at SF#1, SB#10 at SF#2, etc. It should be noted that the frequency band associated with a subframe is not limited to a subband, providing that the frequency band is a predetermined bandwidth that is allocated to a predetermined frequency position. Alternatively, the association between the subframe numbers and the predetermined frequency bandwidths (e.g., subbands) can be predefined.

Figure 4:
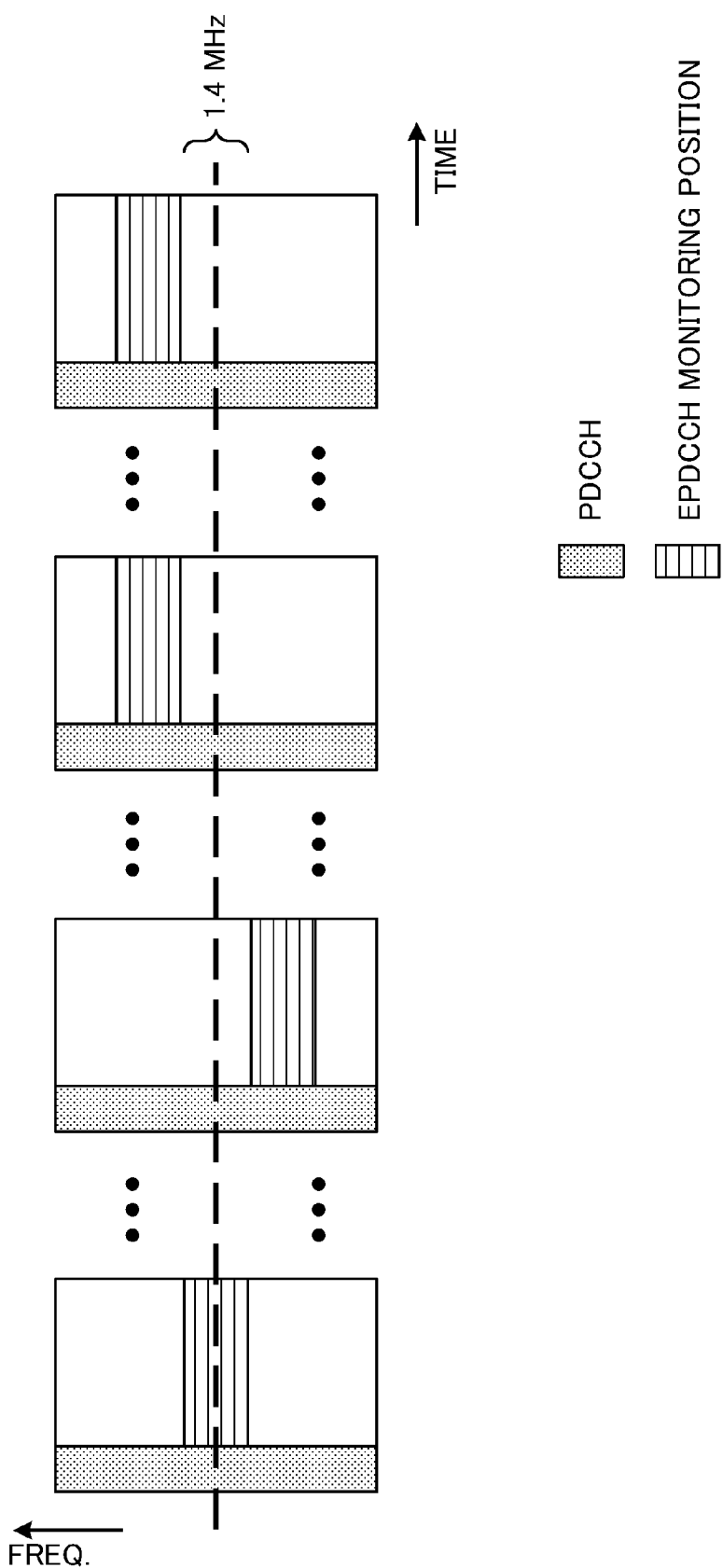
FIG. 4 is an illustrative diagram of EPDCCH allocation, according to a second example.

FIG. 4 shows a diagram of an example of EPDCCH allocation in the second example. The frequency position allocated in the EPDCCH is hopped every subframe.

The notification of the EPDCCH frequency position can include, e.g., a bitmap indicating the radio resource position that allocates the EPDCCH per subframe, the allocation radio resource start position, and the number of RBs of the allocation radio resource. It should be noted that the frequency position notification is not limited to RRC signaling. For example, information on the EPDCCH frequency position can be included in the PBCH, SIB-X and SIB-Y, etc., that are mentioned in the first example.

Furthermore, the frequency position that monitors the EPDCCH can be called a "search space". A search space allocated (set) in the second example may be a common search space that is common with a plurality of user terminals, or may be a user-terminal specific search space (UE-specific search space) that is different for every user terminal. Furthermore, the common search space and the user-terminal specific search space may be configured to be allocated in different subframes.

The subframes to which a common search space is allocated and the subframes to which a user-terminal specific search space is allocated may be predetermined, or may be informed to the user terminal from a radio base station by higher layer signaling (e.g., RRC signaling), or broadcast information (e.g., SIB-X). For example, common search spaces may be allocated to even-numbered subframes (subframe #0, #2, . . . ), and user-terminal specific search spaces may be allocated to odd-numbered subframes (subframe #1, #3, . . . ).

Furthermore, the allocation timing of the search spaces (the search space allocation period, the subframe index, and the offset, etc.) also may be notified to the user terminal by RRC signaling.

Third Example: PDSCH

The third example concerns the PDSCH frequency position allocation.

In the third example, in the case where the PDSCH is scheduled in the same subframe as that of the EPDCCH, the PDSCH is allocated to the resource that is configured in the RRC signaling of the second example. Whereas, in the case where the PDSCH is scheduled in subframe that is different to that of the EPDCCH, in order to obtain a frequency diversity effect, the PDSCH can be mapped to another frequency position having a predetermined bandwidth (e.g., 1.4 MHz).

Note that the scheduling of the PDSCH to a subframe that is different from that of the EPDCCH is called "cross-subframe scheduling". In subframes to which the PDSCH is allocated by cross-subframe scheduling, the user terminal receives the allocated PDSCH without monitoring the EPDCCH.

If cross-subframe scheduling is applied, the user terminal monitors the EPDCCH, which is mentioned in the second example, detects downlink control information (DCI), and obtains the frequency position of the PDSCH allocated to the subsequent subframe.

In addition, the inventors of the present invention discovered a problem with the number of DCI resource allocation bits becoming large if the mapping of the PDSCH to an arbitrary region in the system bandwidth is enabled, thereby increasing the overhead. For example, if PDSCH scheduling between subframes is only applied to the resource allocation region (or an amended region thereof) of an existing DCI, in order to obtain a frequency diversity effect, the resource allocation region ends up increasing.

Consequently, in regard to PDSCH allocation, the inventors of the present invention conceived the idea of obtaining a frequency diversity effect while reducing the DCI overhead (the number of resource allocation bits). Specifically, based on this conceived idea, the inventors of the present invention arrived at a configuration in which a region to which a PDSCH can be allocated is limited by semi-static signaling (RRC, etc.) while notifying the user terminal of the actual allocation region by dynamic signaling (EPDCCH).

In the third example, the radio base station configures a radio resource candidate, to become a predetermined PDSCH allocation candidate, for the user terminal. For example, a frequency position that is different to that of the EPDCCH is configured for the PDSCH as a radio resource candidate. The radio resource candidate can be transmitted via higher layer signaling (e.g., RRC signaling), or via broadcast information (e.g., SIB), etc. Furthermore, the transmission of the frequency position of the PDSCH allocation candidate may include, e.g., a bitmap that indicates the radio resource position allocating the PDSCH per subframe, the start position of the allocation radio resource, or the number of RBs of the allocation radio resource.

Figure 5:
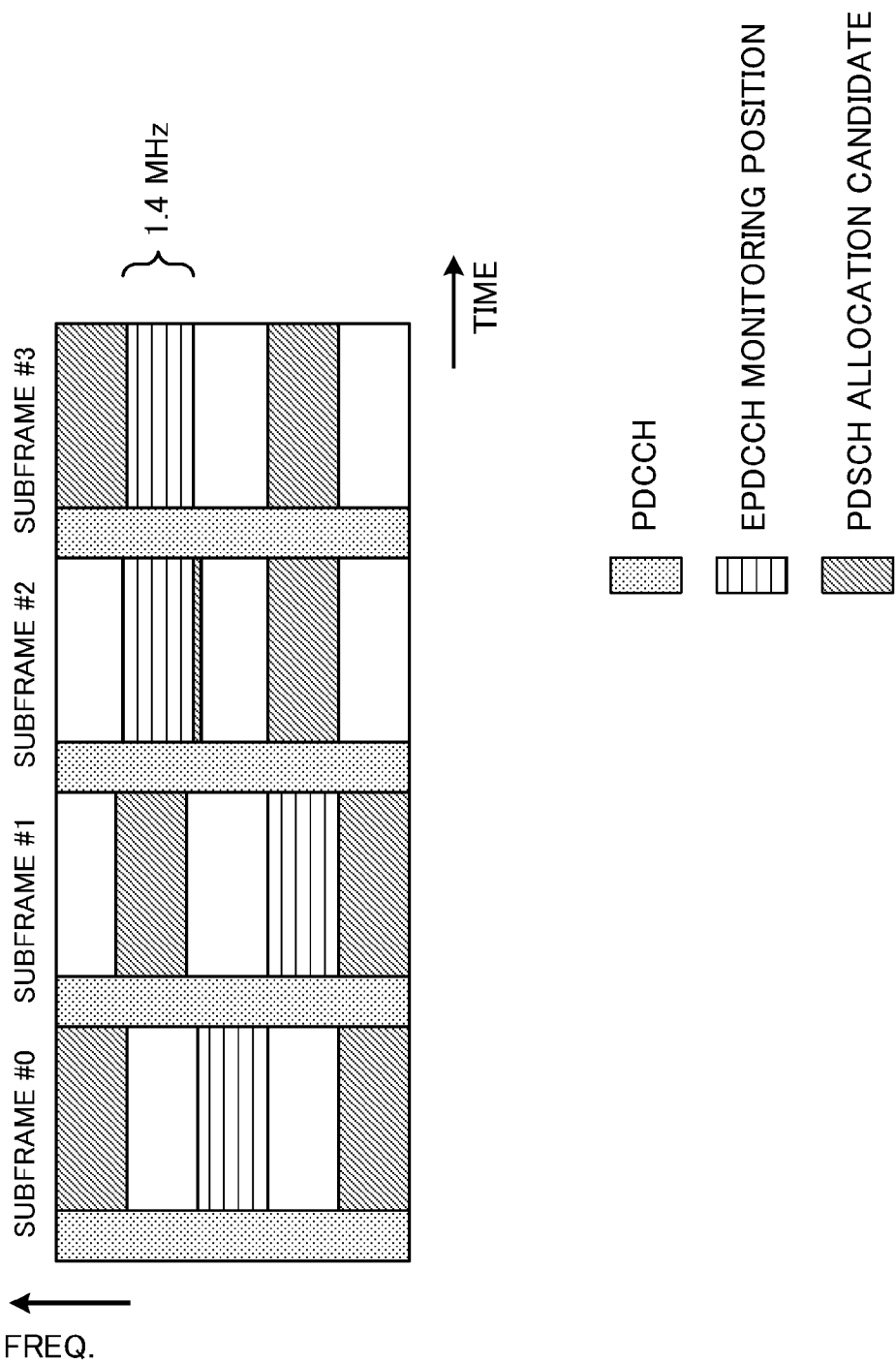
FIG. 5 is an illustrative diagram of EPDCCH and PDSCH allocation, according to a third example.

FIG. 5 is a diagram showing an example of EPDCCH and PDSCH allocation of the third example. FIG. 5 shows EPDCCH monitor positions and PDSCH allocation candidates in four subframes (subframes #0 through #3).

For example, in the case where the PDSCH is scheduled in the same subframe as that of the EPDCCH in subframe #2, since the EPDCCH monitoring position and one of the PDSCH allocation candidates overlap each other, the user terminal can receive the PDSCH at the frequency position of the EPDCCH monitoring position.

Furthermore, in, for example, the EPDCCH of subframe #0, if the user terminal detects cross-subframe scheduling with respect to subframe #1, the PDSCH can be received by selecting one of the PDSCH allocation candidates of subframe #1.

A plurality of radio resource groups can be configured as radio resource candidates. The bandwidth of each radio resource group is not limited to the bandwidth of the EPDCCH (e.g., 6 RB); a larger bandwidth (e.g., 8 RB, 10 RB, etc.) is also possible.

The radio base station dynamically configures the PDSCH frequency position with a DCI. Specifically, a bit field (resource group indicator), which specifies which of the PDSCH allocation candidates to use, is included in the DCI. Furthermore, the bit field can re-read and use a predetermined field (or a predetermined bit location) included in a conventional DCI, or can use a newly specified field. Furthermore, a configuration is possible in which the bit field is included only in the case where the DCI indicates cross-subframe scheduling.

Figures 6A, 6B:
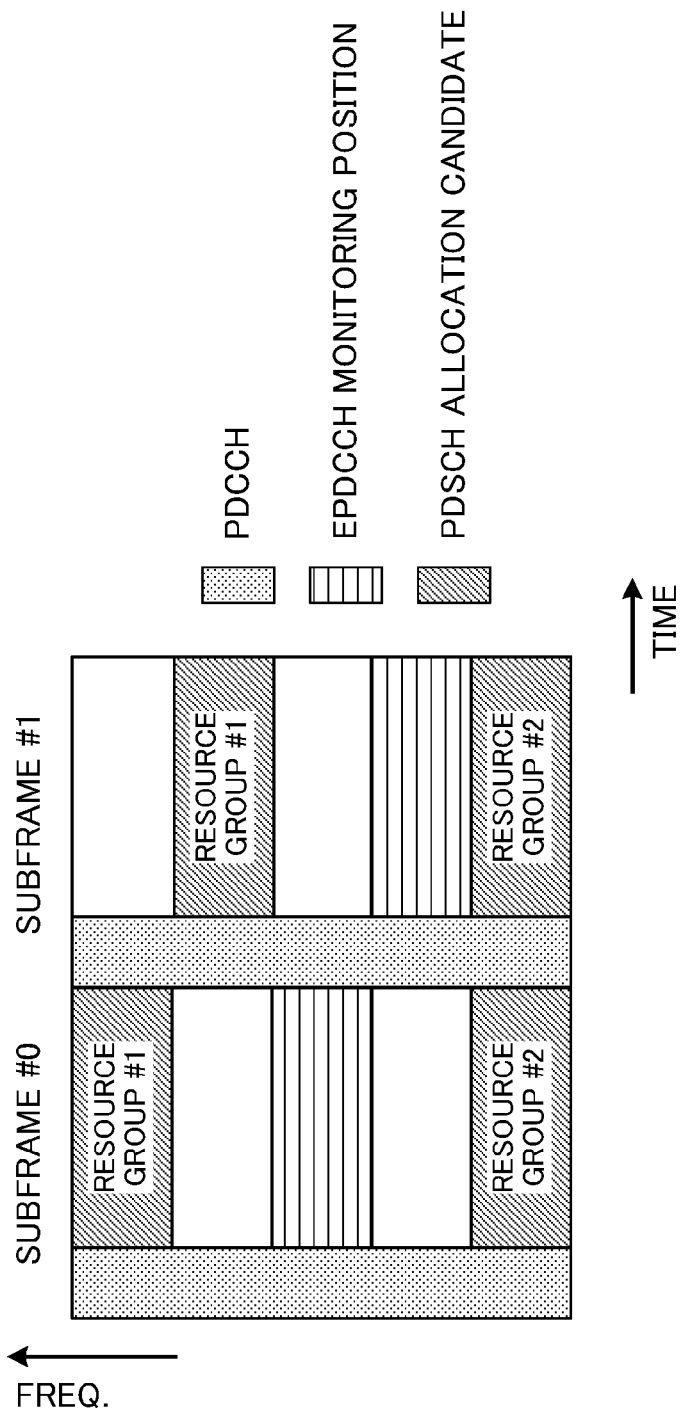
FIG. 6 is an illustrative diagram of a specific example of EPDCCH and PDSCH allocation, according to the third example.

FIG. 6 shows a specific example of EPDCCH and PDSCH allocation according to the third example. In FIG. 6, two radio resource groups (Resource group #1 and #2) are set as radio resource candidates. As shown in FIG. 6A, the frequency positions at which the radio resource groups are respectively arranged per subframe may have different configurations.

FIG. 6B shows an example of a bit field (resource group indicator) that is included in the DCI. In FIG. 6, since only two radio resource groups need to be designated, the corresponding radio resource groups can be expressed as 0 or 1; note that the bit field configuration is not limited thereto, the number of bits of the bit field can be modified if the number of radio resource groups differ from this configuration.

The DCI resource allocation region (e.g., the resource allocation field of DCI format 1A) can indicate which one of the RBs in the radio resource groups is allocated to the PDSCH. For example, if the size of the radio resource group is 6 RBs, it is sufficient to allow for 6 RBs in the resource allocation region. Accordingly, since in the third example the size of the resource allocation region can be reduced compared to a RB of a bandwidth that is the same as that of the system bandwidth (100 RBs in the case of the system bandwidth being 20 MHz), the overhead can be further lowered.

As described above, according to the third example, since the radio resource groups are transmitted by higher layer signaling, and resource allocation can be applied therein, the overhead can be considerably reduced.

Furthermore, according to the third example, the user terminal no longer needs to read an existing PDCCH in order to know the resource to which the PDSCH is allocated. Hence, the time taken to read the PDCCH (the first 1 through 3 symbols of the subframe) can be used for aligning (tuning) the frequency position of the downlink (PDSCH), thereby suppressing deterioration of the reception quality of the PDSCH.

Note that in the case where a plurality of radio resource groups are allocated as described above, it is desirable from the perspective of improvement in frequency utilization efficiency to select an appropriate MCS (Modulation and Coding Scheme) in accordance with the reception quality at each radio resource group. Accordingly, in the third example, each user terminal reports a CQI (Channel Quality Indicator) corresponding to respective radio resource groups to the base station. In the case where the PUCCH is used to periodically report to the base station, one PUCCH radio resource can be used to report the above-mentioned plurality of CQIs to the base station, or a plurality of PUCCH radio resources can be used. Furthermore, in the case where the PUSCH is used to aperiodically report to the base station, the CQI to be reported can be indicated in an uplink grant.

Modified Embodiment

The above description has been directed to the case where each example is applied to a downlink, however, the present invention is not limited thereto. For example, each example can be applied to an uplink. The user terminal can use higher layer signaling (e.g., RRC signaling) to configure radio resource candidates for allocating PRACH, PUSCH (Physical Uplink Shared channel), etc., and dynamically notify the radio base station of information that indicates which of the allocation candidates is actually going to be transmitted.

Furthermore, the above description has been directed to a case where broadcast information, an enhanced PDCCH and a PDSCH are transmitted at each subframe, however, the signal allocation configuration is not limited thereto. For example, with the aim to enhance coverage, the signal allocation configuration may also be applied to a user terminal adapted for a coverage enhancement mode which transmits the same data, and/or low MCS (low coding rate) data over a plurality of subframes.

Figure 7:
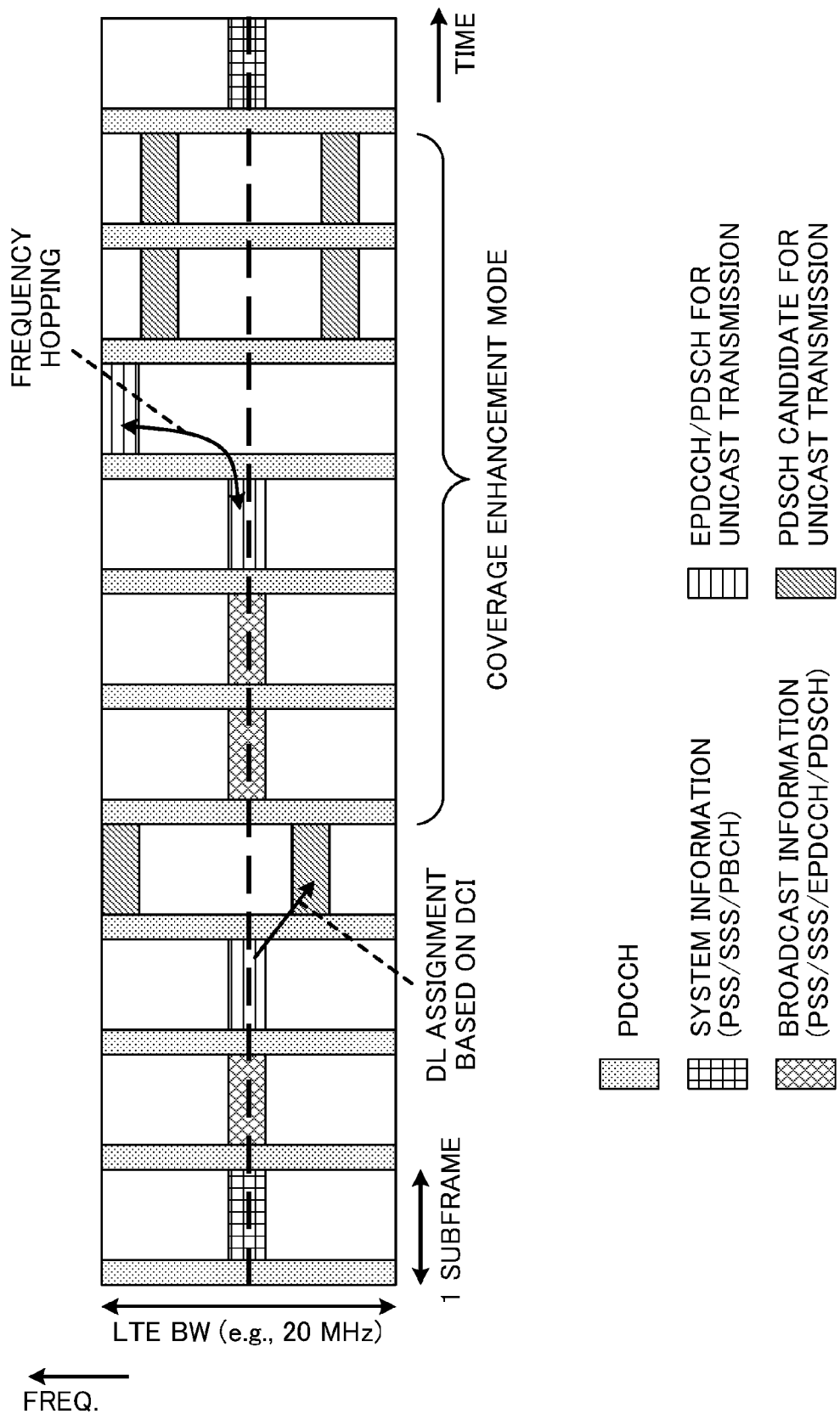
FIG. 7 is an illustrative diagram of signal allocation in a coverage enhancement mode.

FIG. 7 shows an example of signal allocation of the coverage enhancement mode. In the example of FIG. 7, system information (PSS (Primary Synchronization Signal)/SSS (Secondary Synchronization Signal)/PBCH), broadcast information (PSS/SSS/EPDCCH/PDSCH), EPDCCH/PDSCH for unicast transmission, and PDSCH candidates (allocation candidates) for unicast transmission, etc., are transmitted from the base station to the user terminal. In the coverage enhancement mode in FIG. 7, each signal is transmitted over a plurality of subframes (e.g., two subframes). Furthermore, the number of the plurality of subframes is not limited to two. In addition, the plurality of subframes may be continuous subframes or non-continuous subframes.

(Configuration of Radio Communication System)

The following description concerns the configuration of a radio communication system according to an embodiment of the present invention. In this radio communication system, a radio communication method is adopted to which the above-described examples are applied. Furthermore, each communication method can be applied independently, or in combination.

Figure 8:
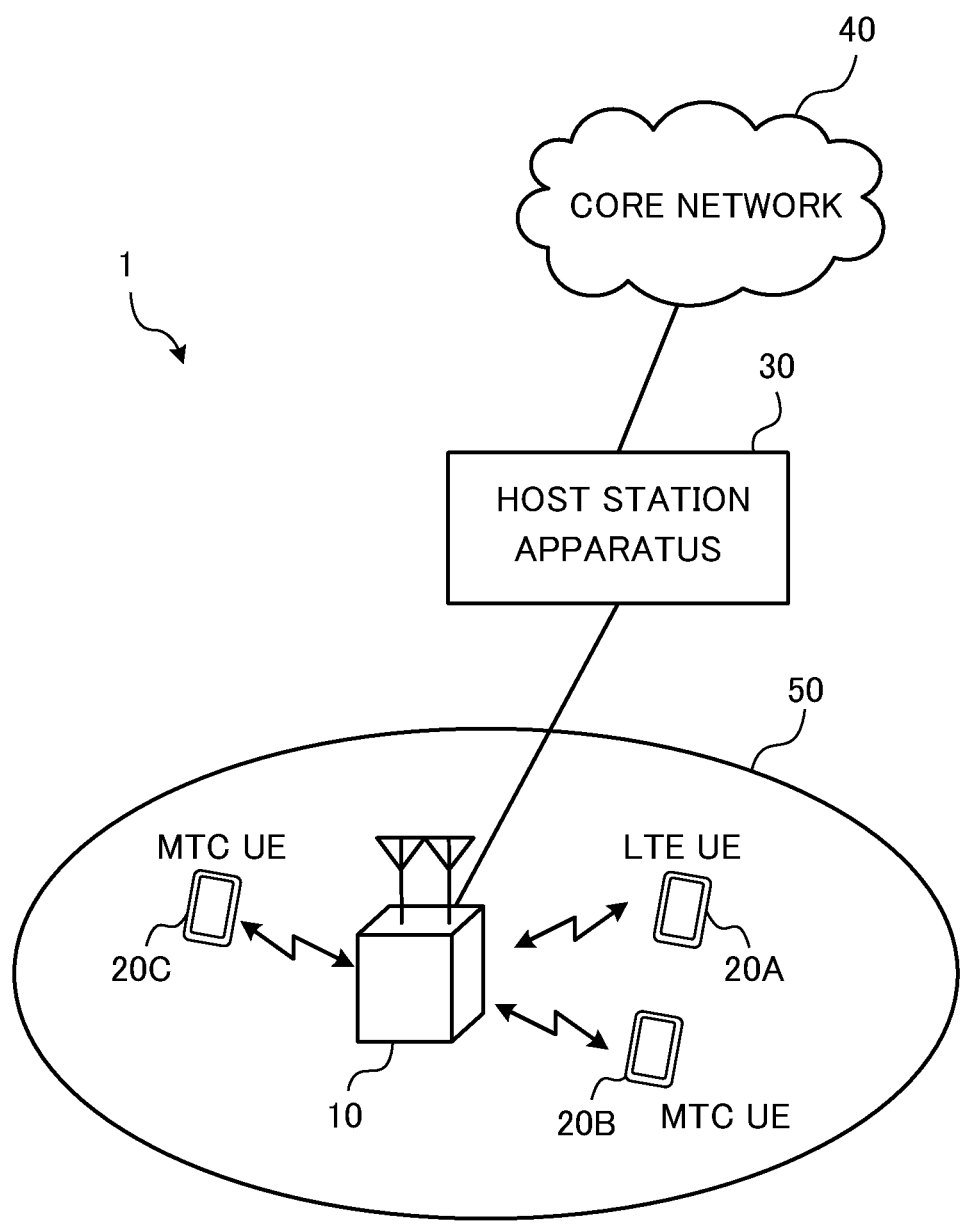
FIG. 8 is an illustrative diagram of a schematic configuration of a radio communication system of according to an illustrated embodiment of the present invention.

FIG. 8 shows an example of a schematic configuration of the radio communication system according to an embodiment of the present invention. The radio communication system is an example that employs an LTE system in a network domain of a machine communication system. Carrier aggregation (CA) and/or dual connectivity (DC), which are integrated fundamental frequency blocks each constituting one unit of a system bandwidth of an LTE system, can be applied to the radio communication system.

In the following descriptions, as an example, the LTE system is configured to have a maximum of 20 MHz system bandwidth in both the downlink and the uplink, however, the LTE system is not limited thereto. It should be noted that the radio communication system used can be called SUPER 3G, LTE-A (LTE-Advanced), or IMT-Advanced, 4G, 5G FRA (Future Radio Access), etc.

As shown in FIG. 8, a radio communication system 1 includes a radio base station 10, and a plurality of user terminals 20A, 20B and 20C wirelessly connected to the radio base station 10. The radio base station 10 is connected to a host station apparatus 30, and this host station apparatus 30 is connected to a core network 40.

The plurality of user terminals 20A, 20B and 20C can carry out communication with the radio base station 10 within a cell 50. For example, the user terminal 20A (first communication terminal) is a user terminal (hereinafter "LTE terminal") that supports LTE (Rel-10) or LTE-Advanced (including Rel-10 onwards), and the other user terminals 20B and 20C are MTC terminals (second communication terminals), which are communication devices in the machine communication system. Hereinafter, in the case where there is no need to distinguish between the user terminals 20A, 20B and 20C, these will be referred to as simply "user terminal 20".

It should be noted that the user terminal 20 can also include stationary communication terminals in addition to mobile communication terminals. Furthermore, the user terminal 20 can carry out communication with other user terminals 20 either directly or via the radio base station 10.

The host station apparatus 30 includes, but is not limited to, an access gateway apparatus, a radio network controller (RNC), and a mobility management entity (MME), etc.

In the radio communication system 1, OFDMA (Orthogonal Frequency Division Multiple Access) is applied to the downlink and SC-FDMA (Single-Carrier Frequency Division Multiple Access) is applied to the uplink as radio access schemes. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that the uplink and downlink radio access schemes are not limited to the above combinations.

In the radio communication system 1, a downlink shared channel (PDSCH: Physical Downlink Shared Channel) that is shared by each user terminal 20, a broadcast channel (PBCH: Physical Broadcast channel), and an L1/L2 control channel, etc., are used as downlink channels. User data and higher layer control information, and a predetermined SIB (System Information Block) are transmitted on the PDSCH. Furthermore, an MIB (Master Information Block) is transmitted on the PBCH.

The downlink L1/L2 control channel includes a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel), etc. Downlink control information (DCI), etc., which includes PDSCH and PUSCH scheduling information, is transmitted by the PDCCH. The number of OFDM symbols used in the PDCCH is transmitted by the PCFICH. A HARQ delivery acknowledgement signal (ACK/NACK) for the PUSCH is transmitted by the PHICH. An EPDCCH that is frequency-division-multiplexed with a PDSCH (downlink shared data channel) can be used for transmitting the DCI in the same as the PDCCH.

In the radio communication system 1, an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc., are used as uplink channels. The PUSCH is used to transmit user data and higher layer control information. Furthermore, the PUCCH is used to transmit downlink radio quality information (CQI: Channel Quality Indicator), and delivery acknowledgement signals. A random access preamble (RA preamble) for establishing a connection with a cell is transmitted by the PRACH.

Figure 9:
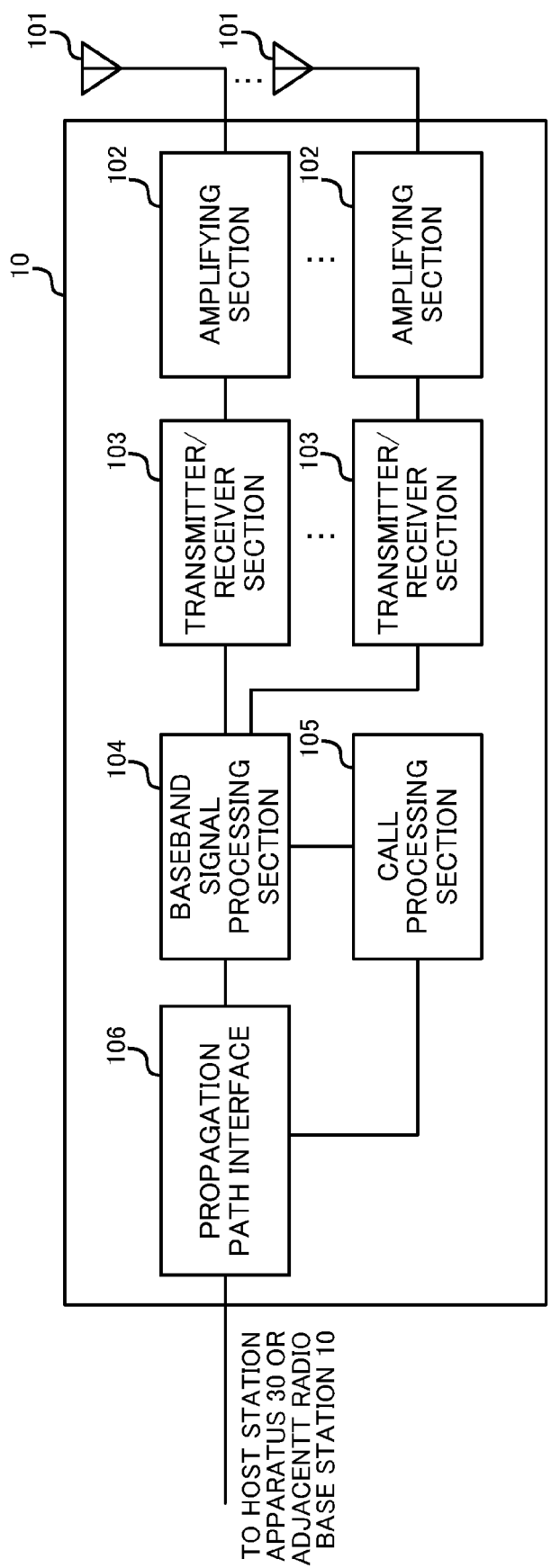
FIG. 9 is an illustrative diagram of an overall configuration of a radio base station according to the illustrated embodiment of the present invention.

FIG. 9 is a diagram illustrating an overall configuration of the radio base station according to the present embodiment. The radio base station 10 is configured to have a plurality of transmission/reception antennas 101 for MIMO transmission, amplifying sections 102, transmitting/receiving sections 103, a baseband signal processing section 104, a call processing section 105 and a transmission path interface 106. Furthermore, each transmitting/receiving section 103 is configured of a transmitting section and a receiving section.

User data that is to be transmitted on the downlink from the radio base station 10 to the user terminal 20 is input from the host station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Furthermore, the baseband signal processing section 104 notifies control information (system information), for communicating with the cell, to the user terminal via higher layer signaling (e.g., RRC signaling, broadcast information, etc.). The information for communication with the cell includes, e.g., the system bandwidth in the uplink, and the system bandwidth in the downlink, etc.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101. Based on common recognition in the field of the art pertaining to the present invention, each transmitting/receiving section 103 can correspond to a transmitter/receiver, a transmitter/receiver circuit or a transmitter/receiver device.

The transmitting/receiving sections 103 can transmit and receive control signals, reference signals, and data signals, etc., on a bandwidth that is limited to a narrower bandwidth (narrow bandwidth) than that of the system bandwidth.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the host station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the host station apparatus 30 via a predetermined interface. Furthermore, the transmission path interface 106 can perform transmission and reception of signals (backhaul signaling) with a neighboring radio base station 10 via an inter-base-station interface (for example, optical fiber, X2 interface).

Figure 10:
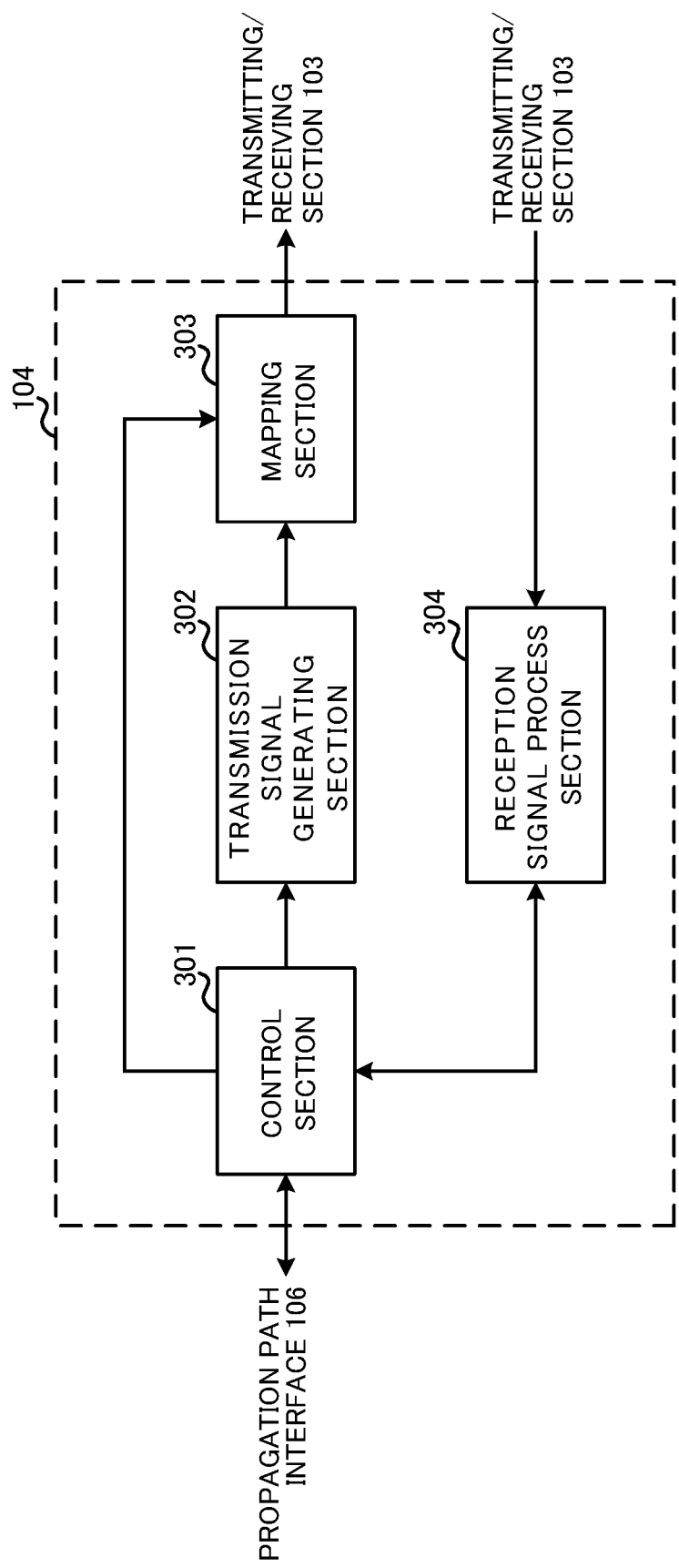
FIG. 10 is an illustrative diagram of a functional configuration of the radio base station according to the illustrated embodiment of the present invention.

FIG. 10 is a diagram illustrating the functional configurations of the radio base station 10 according to the present embodiment. Note that although FIG. 10 mainly shows functional blocks of the features of the present embodiment, the radio base station 10 is also provided with other functional blocks that are necessary for carrying out radio communication.

As illustrated in FIG. 10, the baseband signal processing section 104 provided in the radio base station 10 includes a control section (scheduler) 301, a transmission signal generating section 302, a mapping section 303, and a reception signal processing section 304.

The control section (scheduler) 301 controls scheduling (e.g., resource allocation) of downlink data signals to be transmitted on a PDSCH, and downlink control signals to be transmitted on either or both of PDCCH and enhanced PDCCH (EPDCCH). Furthermore, the control section 301 also controls the scheduling of downlink reference signals, etc., such as system information, synchronization signals, CRS (Cell-specific Reference Signals), and CSI-RS (Channel State Information Reference Signal), etc. Furthermore, the control section 301 also controls the scheduling of uplink reference signals, uplink data signals transmitted on a PUSCH, uplink control signals transmitted on a PUCCH and/or a PUSCH, and an RA preamble transmitted on a PRACH. Based on common recognition in the field of the art pertaining to the present invention, the control section 301 can correspond to a controller, a control circuit or a control device.

The control section 301 controls the transmission signal generating section 302 and the mapping section 303 to allocate and transmit the control signals and the data signals on a narrow bandwidth. It is desirable for the narrow bandwidth to be arranged at a different frequency position per a predetermined period of time (e.g., per subframe); note, however that the time arrangement of the narrow band is not limited thereto. For example, the frequency position of the narrow bandwidth can be determined in accordance with different rules of the even subframes and the odd subframes, or can change to a different frequency position per unit of a plurality of subframes.

The control section 301 performs a control to transmit, as the above-mentioned control signals, system information (MIB, SIB) and EPDCCH allocated on the narrow bandwidth (first example, second example). Furthermore, the control section 301 performs a control to transmit, as the above-mentioned data signals, the PDSCH allocated on the narrow bandwidth (third example). Note that other signals can be allocated on the narrow bandwidth and transmitted thereon.

The transmission signal generating section 302 generates DL signals (downlink control signals, downlink data signals, and downlink reference signals, etc.) based on instructions from the control section 301, and outputs the generated signals to the mapping section 303. For example, the transmission signal generating section 302 generates, based on instructions from the control section 301, a DL assignment that notifies downlink signal allocation information, and a UL grant that notifies uplink signal allocation information. Furthermore, an encoding process and a modulation process are carried out on the downlink data signals in accordance with a coding rate and modulation scheme that are determined based on channel state information (CSI), etc., from each user terminal 20. Based on common recognition in the field of the art pertaining to the present invention, the downlink control signal generating section 302 can correspond to a signal generator or a signal generating circuit.

Based on instructions from the control section 301, the mapping section 303 maps the downlink signal generated in the transmission signal generating section 302 to radio resources to output to the transmitting/receiving sections 103. Based on common recognition in the field of the art pertaining to the present invention, the mapping section 303 can correspond to a mapping circuit and a mapper.

The reception signal processing section 304 performs a receiving process (e.g., demapping, demodulation, and decoding, etc.) on UL signals (e.g., a delivery acknowledgement signal (HARQ-ACK), data signals transmitted on the PUSCH) transmitted from the user terminal. Furthermore, the result of this process is output to the control section 301.

Furthermore, the reception signal processing section 304 may measure, using the received signals, the reception power (e.g., RSRP (Reference Signal Received Power)), the reception quality (RSRQ (Reference Signal Received Quality)), and the channel state, etc. Furthermore, the measurement results may be output to the control section 301.

Based on common recognition in the field of the art pertaining to the present invention, the reception signal processing section 304 can correspond to a signal processor, a signal processing circuit, or a signal processing device; or can be configured as a measurer, a measuring circuit or a measuring device.

Figure 11:
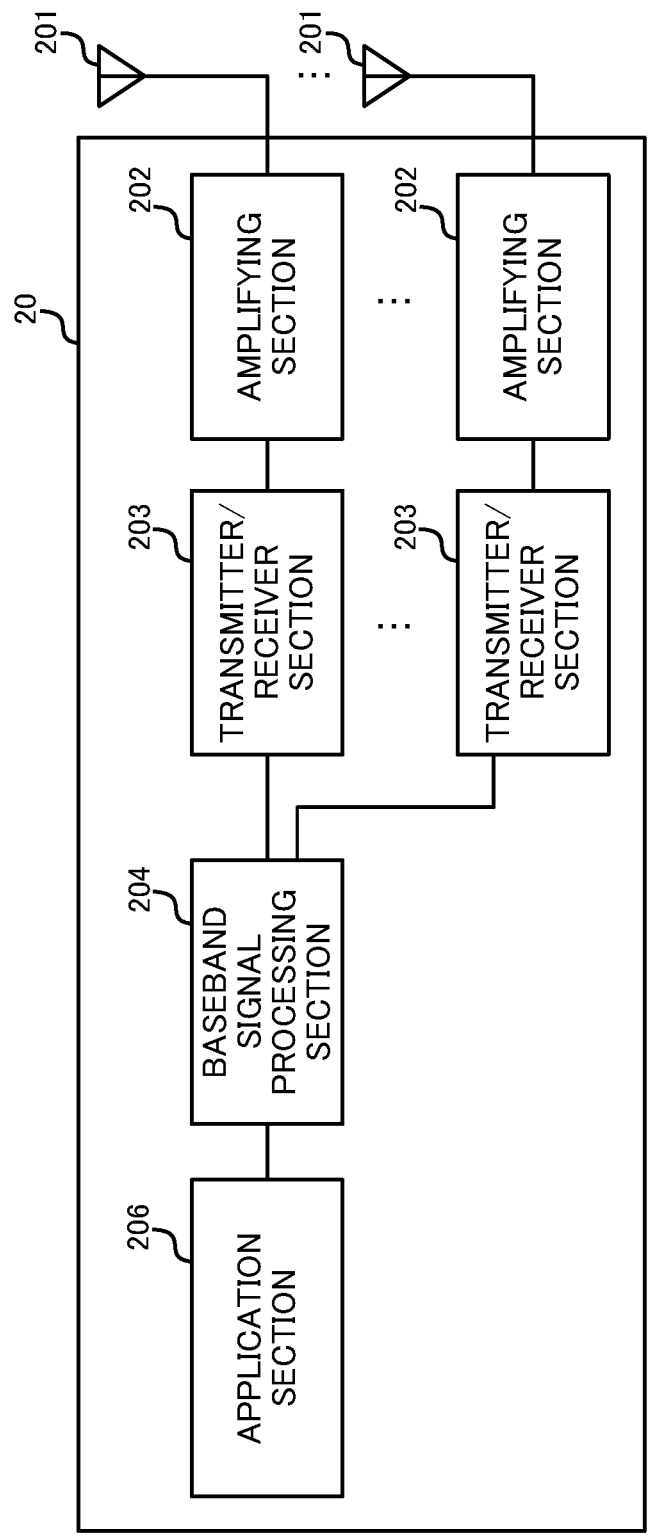
FIG. 11 is an illustrative diagram of an overall configuration of a user terminal according to the illustrated embodiment of the present invention.

FIG. 11 is a diagram showing an overall structure of a user terminal according to the present embodiment. The user terminal 20 is provided with a plurality of transmitting/receiving antennas 201 for MIMO communication, amplifying sections 202, transmitting/receiving sections 203, a baseband signal processing section 204 and an application section 205. Note that each transmitting/receiving section 203 is configured of a transmitting section and a receiving section.

Radio frequency signals that are received in the plurality of transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, and are thereafter output to the baseband signal processing section 204. Based on common recognition in the field of the art pertaining to the present invention, the transmitting/receiving section 203 can correspond to a transmitter/receiver, a transmitting/receiving circuit or a transmitting/receiving device.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

Figure 12:
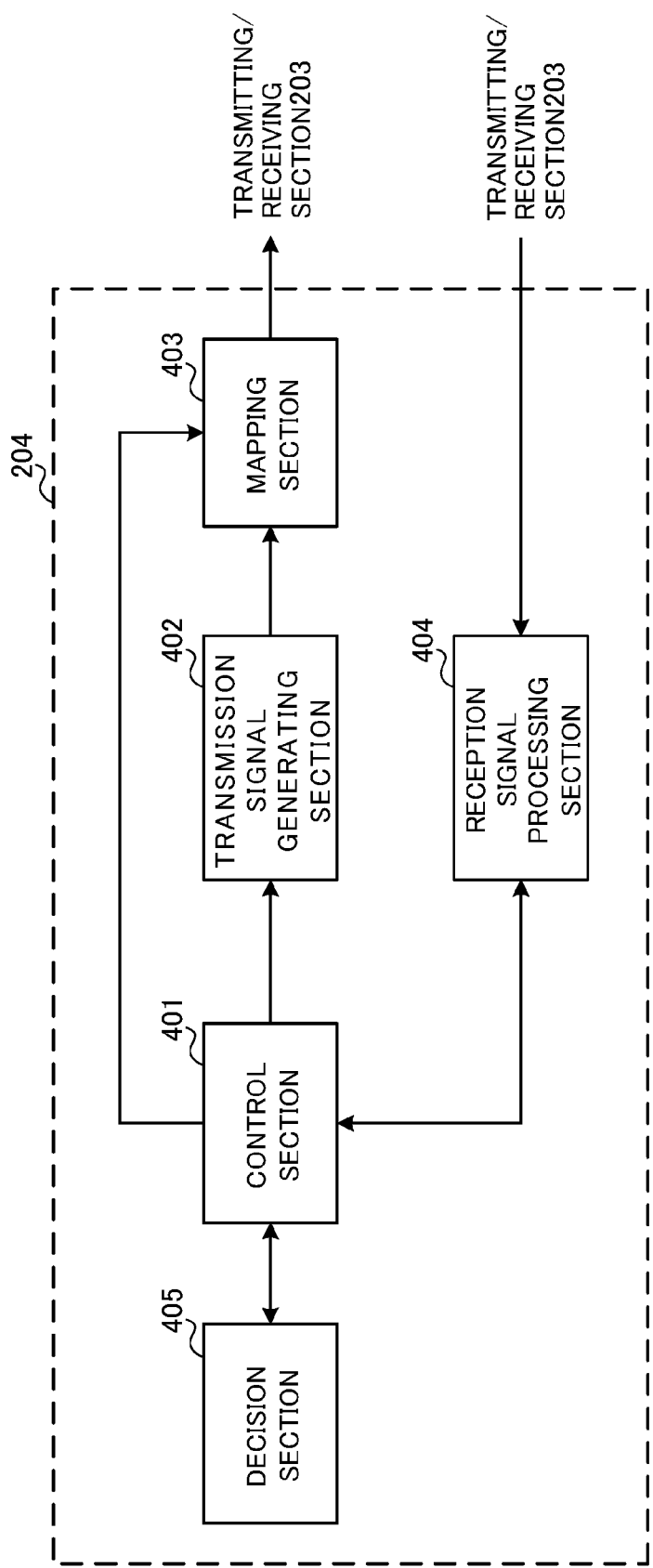
FIG. 12 is an illustrative diagram of a functional configuration of the user terminal according to the illustrated embodiment of the present invention.

FIG. 12 is a diagram illustrating the functional configurations of the user terminal according to the present embodiment. Note that FIG. 12 mainly shows functional blocks of the features of the present embodiment; the user terminal 20 is also provided with other functional blocks that are necessary for carrying out radio communication.

As illustrated in FIG. 12, the baseband signal processing section 204 provided in the user terminal 20 includes a control section 401, a transmission signal generating section 402, a mapping section 403, a reception signal processing section 404, and a decision section 405.

The control section 401 obtains the downlink control signals (signals transmitted on a PDCCH/EPDCCH) and the downlink data signals (signals transmitted on a PDSCH), which were transmitted from the radio base station 10, from the reception signal processing section 404. The control section 401 controls generation of the uplink control signals (e.g., delivery acknowledgement signals (HARQ-ACK), etc.) and the uplink data signals based on the determination result of whether or not a retransmission control is necessary for the downlink control signals and the downlink data signals. Specifically, the control section 401 controls the transmission signal generating section 402 and the mapping section 403. Based on common recognition in the field of the art pertaining to the present invention, the control section 401 can correspond to a controller, a control circuit or a control device.

Furthermore, the control section 401 controls the reception signal processing section 404 to receive the control signals and/or the data signals that are allocated on the narrow bandwidth based on information, input from the decision section 405, on the frequency position at which the narrow bandwidth is arranged.

The decision section 405 decides the frequency position at which the narrow bandwidth is arranged based on given information, and outputs information on the frequency position at which a predetermined signal is allocated to the control section 401. It should be noted that this given information can be input from the control section 401 via a signal received from the transmitting/receiving sections 203 via a process performed by the reception signal processing section 404.

Specifically, the decision section 405 can specify a frequency position of a different SIB based on information on the frequency positions included in a PBCH, SIB, etc. Furthermore, the decision section 405 may include, as the given information, information on a plurality of frequency positions that can allocate MTC-dedicated broadcast information, or may specify, based on this, the frequency position at which the broadcast information (SIB, etc.) is allocated.

Furthermore, the decision section 405 may specify a frequency position allocated to an EPDCCH based on information on a frequency position included in RRC signaling. Furthermore, the decision section 405 may specify a frequency position allocated to a PDSCH based on a DCI included in the EPDCCH.

The transmission signal generating section 402 generates UL signals (uplink control signals, uplink data signals, and uplink reference signals, etc.) based on instructions from the control section 401, and outputs these UL signals to the mapping section 403. For example, the transmission signal generating section 402 generates uplink control signals, such as a delivery acknowledgement signal (HARQ-ACK) and channel state information (CSI), etc., based on instructions from the control section 401. Furthermore, the transmission signal generating section 402 generates uplink data signals based on instructions from the control section 401. For example, in the case where a UL grant is included in the downlink control signal that is transmitted from the radio base station 10, the control section 401 instructs the transmission signal generating section 402 to generate an uplink data signal. Based on common recognition in the field of the art pertaining to the present invention, the transmission signal generating section 402 can correspond to a signal generator, a signal generating circuit, or a signal generating device.

The mapping section 403 maps the uplink signal generated by the transmission signal generating section 402, based on instructions from the control section 401, and outputs the generated signal to the transmitting/receiving sections 203. Based on common recognition in the field of the art pertaining to the present invention, the mapping section 403 can correspond to a mapper, a mapping circuit or a mapping device.

The reception signal processing section 404 performs reception processing (e.g., a downlink control signal transmitted from the radio base station, downlink data signals transmitted on the PDSCH, etc.) on the DL signals (e.g., demapping, demodulation, decoding, etc.). The reception signal processing section 404 outputs the information received from the radio base station 10 to the control section 401. The reception signal processing section 404 outputs, e.g., broadcast information, RRC signaling, DCIs, etc., to the control section 401.

Furthermore, the reception signal processing section 404 may use the received signals to measure the received power (RSRP), received quality (RSRQ), and the channel state, etc. Furthermore, the measurement results may be output to the control section 401.

Based on common recognition in the field of the art pertaining to the present invention, the reception signal processing section 404 can correspond to a signal processor, a signal processing circuit, or a signal processing device; or can be configured as a measurer, a measuring circuit or a measuring device.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU), a communication interface for connecting to a network, a memory and a computer-readable storage medium that stores a program(s).

The processor and memory, etc., are connected to buses for communication of information. Furthermore, the computer-readable storage medium includes, e.g., a flexible disk, a magnetic-optical disk, ROM, EPROM, CD-ROM, RAM, or a hard disk, etc. Furthermore, the program(s) may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads a programs, software modules and data from the storage medium into a memory, and performs the various processes thereof accordingly. The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Hereinabove, the present invention has been described in detail by use of the foregoing embodiments. However, it is apparent to those skilled in the art that the present invention should not be limited to the embodiment described in the specification. For example, the above-described embodiments can be used separately or as a combination thereof. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The disclosure of Japanese Patent Application No. 2014-195797, filed on Sep. 25, 2014, including the specifications, drawings, and abstracts, is incorporated herein by reference in its entirety.

The invention claimed is:

1. A user terminal communicating with use of a narrow bandwidth that is limited to a part of a system band, the user terminal comprising:
    a decision section that decides a frequency position for the narrow bandwidth; and
    a receiving section that receives a downlink signal allocated to the narrow bandwidth based on the frequency position,
    wherein the receiving section uses symbols included in first to third symbols of a subframe to tune to the frequency position without reading the Physical Downlink Control Channel (PDCCH) in the first to third symbols.

2. The user terminal according to claim 1, wherein
    the decision section decides a frequency position of a downlink control channel that is frequency-division-multiplexed with a Physical Downlink Shared Channel (PDSCH), and
    the receiving section monitors the downlink control channel in a common search space that is common to a plurality of user terminals.

3. The user terminal according to claim 2, wherein
    the receiving section monitors the downlink control channel in the common search space and a user terminal-specific search space that varies among user terminals, and
    the common search space and the user terminal-specific search space are allocated to different subframes.

4. The user terminal according to claim 2, wherein the decision section decides a subframe to which the common search space is allocated, on the basis of information provided from a radio base station.

5. A radio communication method for a user terminal communicating with use of a narrow bandwidth that is limited to a part of a system band, the radio communication method comprising:
    deciding a frequency position for the narrow bandwidth; and
    receiving a downlink signal allocated to the narrow bandwidth based on the frequency position,
    wherein the user terminal uses symbols included in first to third symbols of a subframe to tune to the frequency position without reading the Physical Downlink Control Channel (PDCCH) in the first to third symbols.

* * * * *